US010082232B2

(12) United States Patent
Christian, Jr. et al.

(10) Patent No.: US 10,082,232 B2
(45) Date of Patent: *Sep. 25, 2018

(54) QUICK-CONNECT TUBE COUPLING

(71) Applicants: Mercury Plastics LLC, Middlefield, OH (US); Delta Faucet Company, Indianapolis, IN (US)

(72) Inventors: Earl Christian, Jr., Warren, OH (US); William Blue, Middlefield, OH (US); Scott R. Gardner, Middlefield, OH (US); William Shane Hochstetler, Hampton Falls, NH (US)

(73) Assignees: Mercury Plastics LLC, Middlefield, OH (US); Delta Faucet Company, Indianapolis, IN (US)

( * ) Notice: Subject to any disclaimer, the term of this patent is extended or adjusted under 35 U.S.C. 154(b) by 466 days.

This patent is subject to a terminal disclaimer.

(21) Appl. No.: 14/817,869

(22) Filed: Aug. 4, 2015

(65) Prior Publication Data

US 2015/0338004 A1  Nov. 26, 2015

Related U.S. Application Data

(63) Continuation of application No. 13/708,375, filed on Dec. 7, 2012, now Pat. No. 9,103,478.

(Continued)

(51) Int. Cl.
*F16L 39/00* (2006.01)
*F16L 37/08* (2006.01)
(Continued)

(52) U.S. Cl.
CPC .............. *F16L 37/082* (2013.01); *F16L 21/03* (2013.01); *F16L 21/08* (2013.01); *F16L 37/1205* (2013.01); *F16L 37/127* (2013.01)

(58) Field of Classification Search
CPC ....... F16L 21/08; F16L 37/08; F16L 37/1205; F16L 37/1225; F16L 37/127
(Continued)

(56) References Cited

U.S. PATENT DOCUMENTS

| 325,686 A | * | 9/1885 | May et al. | ............... F16L 37/20 |
| | | | | 285/311 |
| 734,377 A | * | 7/1903 | Toerge | ................... F16L 37/20 |
| | | | | 285/311 |

(Continued)

FOREIGN PATENT DOCUMENTS

| FR | 2729453 A1 | 7/1996 |
| GB | 602737 | 2/1945 |
| GB | 1365815 | 9/1974 |

OTHER PUBLICATIONS

USPTO Office Action ofr U.S. Appl. No. 13/708,403 dated Nov. 22, 2013.

*Primary Examiner* — Aaron M Dunwoody
(74) *Attorney, Agent, or Firm* — Hahn Loeser & Parks, LLP

(57) ABSTRACT

A quick-connect fitting includes a polymeric first connector in fluid communication with a first component, and a polymeric second connector in fluid communication with a second component. The first connector is either a male fitting or a female fitting, and the other of the male fitting and female fitting is the second connector. The female fitting includes a longitudinal cylindrical cavity having therein a retaining ring retaining an o-ring, and the male fitting includes a cylindrical body and a tubular sealing element extending longitudinally therefrom positionable within the polymeric female fitting and o-ring in sealing engagement. The quick connect fitting includes a clip pivotably connected to the second connector moving between a first position connecting the female fitting to the male fitting when the (Continued)

male fitting is positioned within the female fitting and a second position in which the male fitting is removable from the female fitting.

12 Claims, 7 Drawing Sheets

Related U.S. Application Data

(60) Provisional application No. 61/568,905, filed on Dec. 9, 2011.

(51) Int. Cl.
*F16L 37/12* (2006.01)
*F16L 21/03* (2006.01)
*F16L 21/08* (2006.01)
*F16L 37/127* (2006.01)

(58) Field of Classification Search
USPC .......................................... 285/311, 320, 312
See application file for complete search history.

(56) References Cited

U.S. PATENT DOCUMENTS

| | | | | |
|---|---|---|---|---|
| 752,085 | A * | 2/1904 | Long | F16L 37/20 |
| | | | | 285/311 |
| 755,249 | A * | 3/1904 | Seals | F16L 37/20 |
| | | | | 285/311 |
| 1,436,882 | A * | 11/1922 | Knepper | F16L 37/1225 |
| | | | | 285/319 |
| 1,458,337 | A | 6/1923 | Grier | |
| 1,483,268 | A * | 2/1924 | Baldauf | F16L 37/096 |
| | | | | 141/383 |
| 1,850,879 | A * | 3/1932 | Hunt | F16K 3/265 |
| | | | | 251/149.9 |
| 2,281,633 | A | 5/1942 | Stitzer | |
| 2,497,273 | A | 2/1950 | Richardson | |
| 2,520,215 | A * | 8/1950 | Kerr | F16L 37/127 |
| | | | | 285/276 |
| 3,278,205 | A * | 10/1966 | Barlow | F16L 37/1205 |
| | | | | 137/614 |
| 3,325,192 | A | 6/1967 | Sullivan | |
| 3,830,525 | A * | 8/1974 | Ransford, III | H01R 13/62933 |
| | | | | 285/2 |
| 4,032,177 | A | 6/1977 | Anderson | |
| 4,068,870 | A * | 1/1978 | Whitney | A61M 39/1011 |
| | | | | 285/320 |
| 4,230,345 | A * | 10/1980 | Boelkins | B60T 17/04 |
| | | | | 285/24 |
| 4,458,719 | A * | 7/1984 | Strybel | F16L 37/127 |
| | | | | 137/614.03 |
| 4,616,859 | A | 10/1986 | Brunet | |
| 4,691,726 | A | 9/1987 | Studer et al. | |
| 5,074,332 | A * | 12/1991 | Jones | F16L 37/1205 |
| | | | | 137/614.06 |
| 5,131,687 | A | 7/1992 | Marchou | |
| 5,156,421 | A | 10/1992 | Chauvel | |
| 5,248,306 | A | 9/1993 | Clark et al. | |
| 5,309,609 | A * | 5/1994 | Janiszewski | F02M 37/0017 |
| | | | | 24/338 |
| 5,330,235 | A | 7/1994 | Wagner et al. | |
| 5,395,140 | A * | 3/1995 | Wiethorn | F16L 37/0985 |
| | | | | 285/320 |
| 5,401,065 | A | 3/1995 | Okumura et al. | |
| 5,437,648 | A | 8/1995 | Graves et al. | |
| 5,447,337 | A * | 9/1995 | Ruckwardt | F16L 37/127 |
| | | | | 285/24 |
| 5,496,274 | A | 3/1996 | Graves et al. | |
| 5,628,531 | A | 5/1997 | Rosenberg et al. | |
| 5,797,634 | A | 9/1998 | Bonser | |
| 6,096,024 | A | 8/2000 | Graves et al. | |
| 6,220,859 | B1 | 4/2001 | Hoffman | |
| 6,422,607 | B1 | 7/2002 | Kirby | |
| 6,447,017 | B1 | 9/2002 | Gilbreath et al. | |
| 6,499,772 | B1 | 12/2002 | Minemyer | |
| 6,554,320 | B2 | 4/2003 | Cresswell | |
| 6,672,628 | B2 | 1/2004 | Thomas et al. | |
| 6,672,792 | B1 | 1/2004 | Schipani et al. | |
| 7,128,347 | B2 | 10/2006 | Kerin | |
| 7,547,048 | B2 | 6/2009 | Catlow | |
| 7,658,420 | B2 | 2/2010 | Harger et al. | |
| 7,681,327 | B2 | 3/2010 | Koljonen et al. | |
| 7,766,043 | B2 | 8/2010 | Thomas et al. | |
| 7,819,137 | B2 | 10/2010 | Nelson et al. | |
| 7,850,898 | B1 | 12/2010 | Rowley et al. | |
| 7,891,382 | B2 | 2/2011 | Rushlander et al. | |
| 7,891,973 | B2 | 2/2011 | Lenoir | |
| 7,927,534 | B1 | 4/2011 | Seman, Sr. et al. | |
| 8,038,180 | B2 | 10/2011 | Williams et al. | |
| 8,220,126 | B1 | 7/2012 | Yunk et al. | |
| 8,277,714 | B1 | 10/2012 | Blue et al. | |
| 8,329,088 | B1 | 12/2012 | Rowley et al. | |
| 8,337,738 | B1 | 12/2012 | Seman, Sr. et al. | |
| 8,343,407 | B1 | 1/2013 | Seman, Sr. et al. | |
| 8,365,770 | B2 | 2/2013 | Thomas et al. | |
| 8,431,067 | B2 | 4/2013 | Rowley et al. | |
| 8,454,874 | B2 | 6/2013 | Rushlander et al. | |
| 8,646,476 | B2 | 2/2014 | Thomas et al. | |
| 9,103,478 | B2 * | 8/2015 | Christian, Jr. | F16L 37/1205 |
| 9,657,879 | B1 * | 5/2017 | Currey | F16L 37/138 |
| 2005/0161942 | A1 | 7/2005 | Takayanagi | |
| 2007/0132235 | A1 * | 6/2007 | Catlow | F16L 37/08 |
| | | | | 285/305 |
| 2009/0102188 | A1 * | 4/2009 | Ishiki | F16L 37/0987 |
| | | | | 285/148.26 |
| 2010/0148497 | A1 * | 6/2010 | Kaneda | F16L 37/0987 |
| | | | | 285/82 |
| 2010/0191193 | A1 * | 7/2010 | Pajunk | A61M 25/0014 |
| | | | | 604/250 |
| 2011/0180158 | A1 * | 7/2011 | Arcati | B65H 75/403 |
| | | | | 137/355.26 |
| 2017/0114937 | A1 * | 4/2017 | Bippus | F16L 37/138 |

* cited by examiner

QUICK-CONNECT TUBE COUPLING

This application claims the benefit of U.S. Provisional Patent Application 61/568,905, filed Dec. 9, 2011.

BACKGROUND

Some appliance applications have a tube connected to a second part, where the second part may be a water source, a water dispensing apparatus, a filtering apparatus, another tube, or other part or assembly. For example, some refrigerator doors contain a water and/or ice dispenser that receives water by way of a tube through the hinge. In order to facilitate assembly and removal of the refrigerator door, a portion of the tube was installed in the door, and a waterway connector was placed near the hinge to enable the tube to be connected and disconnected from a tube from the water source.

In the past, various waterway connections were used, often press-fit into the end of a tube, and included features that locked or threaded together to make a connection. In many waterway applications, leak-proof connections were desired, and certain prior connections were developed to ensure a suitable seal. However, to provide a suitable seal, such connections were connected so securely that they were difficult to disconnect when service or disassembly was needed. Other prior connections were easy to disconnect, but enabled inadvertent loosening or separation and could not be used in applications where leak-proof connections were desired. Additionally, many such connections were disassembled by a consumer, for example to remove a refrigerator door to facilitate moving the appliance. Consumers found disassembly of the prior connections difficult, and frequently failed to reassemble the prior connections properly enabling leaks in the connections. Consumer disassembly of prior waterway connections resulted in increased repair calls and consumer dissatisfaction with the difficulty of proper disassembly and reassembly, increasing the costs associated with prior connections.

SUMMARY OF THE DISCLOSURE

What is disclosed is a quick-connect fitting including a polymeric first connector and a polymeric second connector, the first connector being either a male fitting or a female fitting, and the other of the male fitting or the female fitting being the second connector, the female fitting having a longitudinal cylindrical cavity having therein a retaining ring retaining an o-ring, and the male fitting having a cylindrical body and a tubular sealing element extending longitudinally therefrom positionable within the polymeric female fitting and o-ring in sealing engagement, and a clip pivotably connected to the second connector moving between a first position connecting the female fitting to the male fitting when the male fitting is positioned within the female fitting and a second position in which the male fitting is removable from the female fitting.

The clip is pivotally connected to the female fitting or the male fitting such that the clip is pivotable about an axis transverse to the longitudinal direction of the fitting. In one embodiment, the clip includes a projection transverse to the longitudinal direction of the female fitting engaging a corresponding recess in an outside surface of the female fitting in the clip first position inhibiting relative movement between the clip and the female fitting in the longitudinal direction of the female fitting.

In one exemplary embodiment of the above quick connect fitting, the first connector is overmolded onto a tube and the second connector is in fluid communication with, and may be integral with, a second component such as a valve, a tube, a pipe, a diverter, a manifold, a fixture, a Y connector, a T connector, or other component. In an alternative exemplary embodiment, the second connector is overmolded onto a tube and the first connector is in fluid communication with, and may be integral with, a first component such as a valve, a tube, a pipe, a diverter, a manifold, a fixture, a Y connector, a T connector, or other component. In another exemplary embodiment, the first connector is overmolded onto a first tube and the second connector is overmolded onto a second tube. In yet another exemplary embodiment, the first connector is in fluid communication with, and may be integral with, the first component and the second connector is in fluid communication with, and may be integral with, the second component.

Another quick-connect fitting is disclosed including a polymeric male fitting overmolded onto a first tube, the male fitting having a cylindrical body and a tubular sealing element extending longitudinally therefrom positionable within a polymeric female fitting overmolded onto a second tube, the polymeric female fitting having a longitudinal cylindrical cavity having therein a retaining ring retaining an o-ring, the o-ring having an inside diameter corresponding to an outside diameter of the tubular sealing element in sealing engagement. The quick-connect fitting further includes a clip pivotable between a first position connecting the female fitting to the male fitting when the male fitting is positioned within the female fitting and a second position in which the male fitting is removable from the female fitting, the clip engaging the first tube or the second tube at a tube engagement location in the first position.

The clip is pivotally connected to the male fitting or the female fitting such that the clip is pivotable about an axis transverse to the longitudinal direction of the fitting. For certain applications, the clip has a projection transverse to the longitudinal direction of the female fitting engaging a corresponding recess in an outside surface of the female fitting in the clip first position inhibiting relative movement between the clip and the female fitting in the longitudinal direction of the female fitting.

In one alternative to the above quick-connect fitting, the polymeric male fitting is overmolded onto a tube and the female fitting is not overmolded onto a tube. In an exemplary embodiment of this alternative, the female fitting is integral with a component such as a valve, a tube, a pipe, a diverter, a manifold, a fixture, a Y connector, or a T connector, and the male fitting overmolded onto a tube connects to the component by the integral female fitting. In another example, the female fitting is connected in fluid communication with the component. In another alternative, the female fitting is overmolded onto a tube and the male fitting is not overmolded onto a tube. In an exemplary embodiment of this alternative, the male fitting is integral with a component, and the female fitting overmolded onto a tube connects to the component by the integral male fitting. In another example, the male fitting is connected in fluid communication with the component.

A process is disclosed for connecting a fluid component to another fluid component including
installing a polymeric first connector overmolded onto a first tube in fluid communication with a first component, and a polymeric second connector in fluid communication with a second component, the first connector being either a male fitting or a female fitting, and the other of the male fitting or the female fitting being the second connector, the female fitting having a longitudinal cylindrical cavity having therein a retaining ring retaining an o-ring, and the male fitting having a cylindrical body and a tubular sealing element extending longitudinally therefrom positionable within the polymeric female fitting and o-ring in sealing engagement, the second connector comprising a clip pivotably connected moving between a first position connecting the female fitting to the male fitting when the male fitting is positioned within the female fitting and a second position in which the male fitting is removable from the female fitting, and positioning the male fitting within the female fitting in sealing engagement, and connecting the female fitting to the male fitting by fastening the pivotable clip connecting the female fitting to the male fitting, the clip engaging the first tube at a tube engagement location in the first position.

Also disclosed is a process for providing a quick-connect fitting including installing a first tube having a polymeric male fitting overmolded onto a first tube in fluid communication with a first component, the male fitting having a cylindrical body and a tubular sealing element extending longitudinally therefrom positionable within a crosslinked polymeric female fitting overmolded onto a second tube, installing the second tube with the crosslinked polymeric female fitting in fluid communication with a second component, the female fitting having a longitudinal cylindrical cavity having therein a retaining ring retaining an o-ring, the o-ring having an inside diameter corresponding to an outside diameter of the tubular sealing element in sealing engagement, positioning the male fitting within the female fitting in sealing engagement, and connecting the female fitting to the male fitting by fastening a pivotable clip connecting the female fitting to the male fitting, the clip engaging the first tube or the second tube at a tube engagement location in the first position.

The process may include pivotally connecting the clip to the female fitting such that the clip is pivotable about an axis transverse to the longitudinal direction of the female fitting. Alternatively or additionally, the clip may include a projection transverse to the longitudinal direction of the female fitting engaging a corresponding recess in an outside surface of the female fitting in the clip first position inhibiting relative movement between the clip and the female fitting in the longitudinal direction of the female fitting.

DETAILED DESCRIPTION OF PARTICULAR EMBODIMENTS

The present quick-connect tube coupling may be used for various applications in which one fluid component is connected to another fluid component, where a first connector is either a male fitting or a female fitting of the present disclosure and a second connector is the other of the male fitting or the female fitting. In various applications, for example, the first component is connected in fluid communication to the first connector and the second component is connected in fluid communication to the second connector, so that the first and second connectors can be connected together in a male-female tube connection to join the first and second fluid components in fluid communication. Whether the first connector is the male fitting or the female fitting may not matter for some applications, but for other applications, such as where the first fitting must fit in a space having a particular size or shape or other requirement, the first connector may specifically be selected to be the male fitting or the female fitting to satisfy various requirements of the particular application as desired.

Figure 1A:
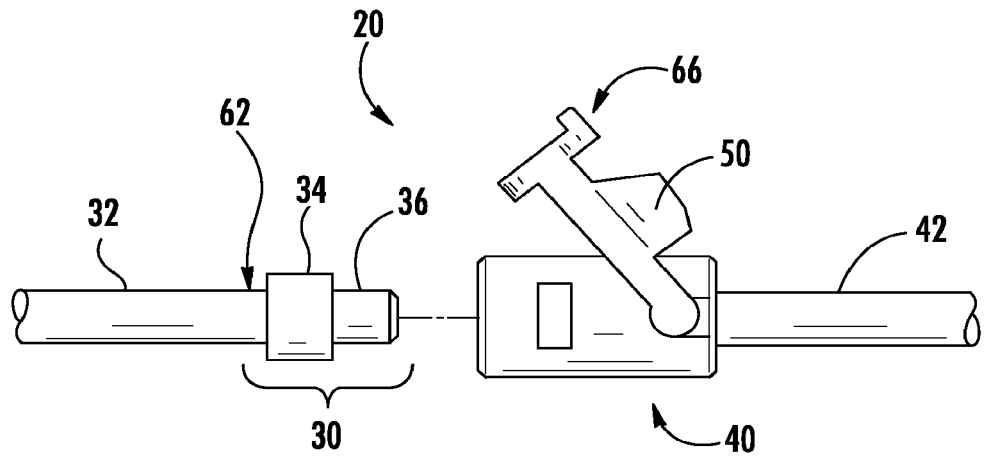
FIG. 1A is a side elevational view of a quick-connect tube coupling of the present disclosure showing the male and female fittings separately.
Figure 1B:
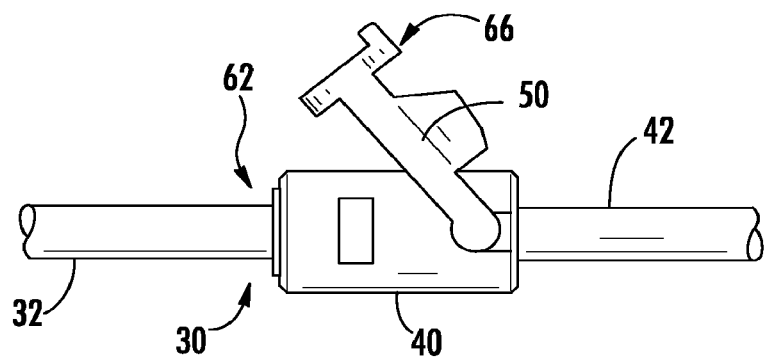
FIG. 1B is a side elevational view of the quick-connect tube coupling of FIG. 1A showing the male and female fittings in engagement and unfastened.
Figure 1C:
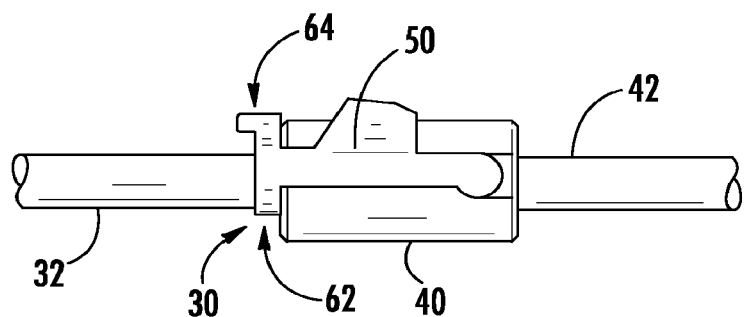
FIG. 1C is a side elevational view of the quick-connect tube coupling of FIG. 1A showing the male and female fittings in engagement and fastened by a clip.

Referring now to FIGS. 1A through 1C, a quick-connect tube coupling 20 of the present disclosure includes a polymeric first connector being either a male fitting 30 or a corresponding female fitting 40, and a polymeric second connector being the other of the male fitting or the female fitting. A clip 50 is pivotably connected to the second connector moves between a first position connecting the female fitting to the male fitting when the male fitting is positioned within the female fitting as shown in FIG. 1C and a second position in which the male fitting is removable from the female fitting as shown in FIGS. 1A and 1B, as further discussed below. In the first position connecting the female fitting to the male fitting, a portion of the clip 50 extends beyond an end 61 of the second connector.

In the alternative shown in FIGS. 1A through 1C, the male fitting 30 is a polymeric fitting overmolded onto a first tube 32. The male fitting 30 includes a cylindrical body 34 and a tubular sealing element 36 extending longitudinally therefrom positionable within the female fitting 40. In the example shown in FIG. 1A, the tubular sealing element 36 is an elongated uniformly-diametered cylindrical element, optionally terminating at a beveled tip at an end of the male fitting. Alternatively, the tubular sealing element 36 may be a tapered element.

Figure 2:
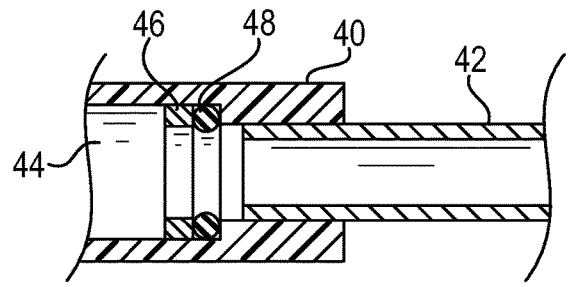
FIG. 2 is a cross-sectional view through the female fitting shown in FIG. 1A with the clip removed for clarity.

In the alternative shown in FIGS. 1A through 1C, the female fitting 40 is a polymeric fitting overmolded onto a second tube 42. With reference to FIG. 2, the female fitting 40 has a longitudinal cylindrical cavity 44. In a preferred embodiment, the polymer of the female fitting is crosslinked to set a permanent inside diameter of the cylindrical cavity 44 and shape memory characteristics, as discussed below.

Within the cylindrical cavity 44, the female fitting 40 includes a retaining ring 46 retaining an o-ring 48. The o-ring 48 has an outside diameter corresponding to the inside diameter of the cylindrical cavity 44 in sealing engagement, and the o-ring 48 has an inside diameter corresponding to the outside diameter of the tubular sealing element 36 in sealing engagement. When the male fitting 30 is positioned within the female fitting 40, the o-ring 48 is sealingly positioned between an inside diameter of the cylindrical cavity 44 of the female fitting and an outside diameter of the tubular sealing element 36 of the male fitting in sealing engagement.

The retaining ring 46 has a retaining ring inside diameter larger than the outside diameter of the tubular sealing element 36 so that the tubular sealing element 36 may pass through the retaining ring 46 to engage the o-ring 48. The retaining ring 46 also has an outside diameter larger than the inside diameter of the cylindrical cavity 44 such that the retaining ring 46 is forcibly inserted into the cylindrical cavity 44 and retained by the shape memory property of the crosslinked polymer of the cylindrical cavity 44 and the interference between the retaining ring 46 and the cylindrical cavity 44. To further explain, crosslinking imparts a "memory" to the polymer's original shape and dimensions, and upon deformation of a crosslinked shape, the deformed member tends to resort back to the original dimension upon the application of, for example, heat or the passage of time. Using this shape-memory feature permits leak-proof engagement between the inner walls of the cylindrical cavity and the outside diameter of the retaining ring 46 by providing the ring outside diameter slightly larger than the inner walls of the cylindrical cavity. The larger ring expands the cylindrical cavity of the female fitting and the shape memory property of the female fitting tends to draw the shape of the cylindrical cavity in the direction of its original dimension, urging the inner walls of the cylindrical cavity tightly around the ring. This is particularly preferable when the polymeric walls are polyethylene, which when crosslinked become crosslinked polyethylene or "PEX." The shape memory property of the crosslinked polymer of the cylindrical cavity 44 can be used to hold the retaining ring 46 in the cylindrical cavity 44 without using any other locking or retaining feature such as grooves, detents, interlocking features, adhesives or other retaining or locking features. Alternatively, for certain applications, the female fitting may be made from a polymer that has not been crosslinked but having desired creep resistant properties such that the hoop stress in the female fitting maintains a desired engagement of the retaining ring.

The retaining ring 46 is made from a rigid or semi-rigid material, and may be a metal, such as copper, stainless steel, brass, or other metal, or may be a polymeric material such as polyacetal, nylon or polyamide, acrylonitrile butadiene styrene terpolymer, polystyrene, polycarbonate, polyvinyl chloride, polyethylene terephthalate polyester, or other polymeric material as desired for the application suitable for retaining the o-ring 48 in the cylindrical cavity 44. In one example, the retaining ring is glass-filled nylon. The o-ring 48 is made from an elastomeric material such as, for example, ethylene-propylene copolymer (EPDM), nitrile or buna-N, silicone, rubber, or thermoplastic elastomer as desired for the application suitable for sealing the tubular sealing element 36 in the cylindrical cavity 44. In one exemplary embodiment, the o-ring 48 is nitrile.

The first tube 32 and the second tube 42 are polymeric tubes typically formed by extrusion. It is contemplated that one or both of the tubes 32, 42 may be injection molded for certain applications in which the tube length and shape is suited for injection molding. In one example, the first tube 32 and the second tube 42 are crosslinked high density polyethylene.

Figure 5:
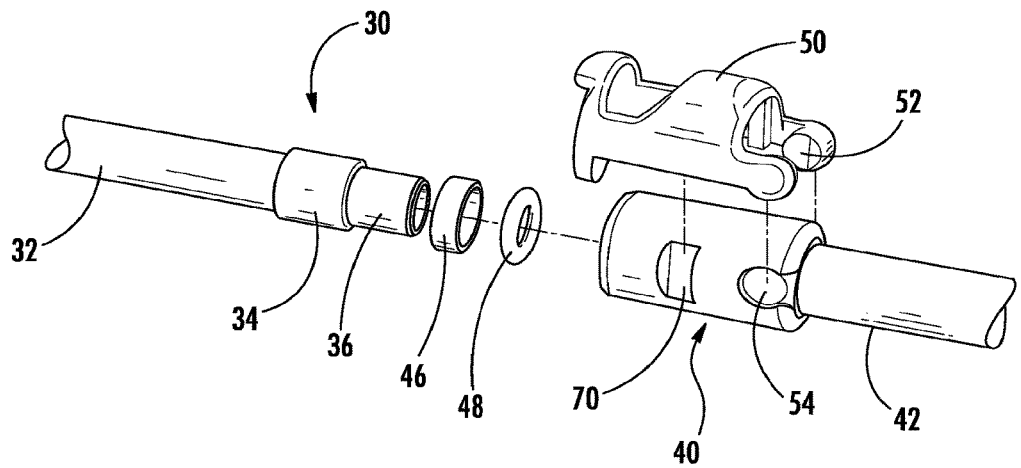
FIG. 5 is an exploded view of the quick-connect tube coupling of FIG. 1A.
Figure 6:
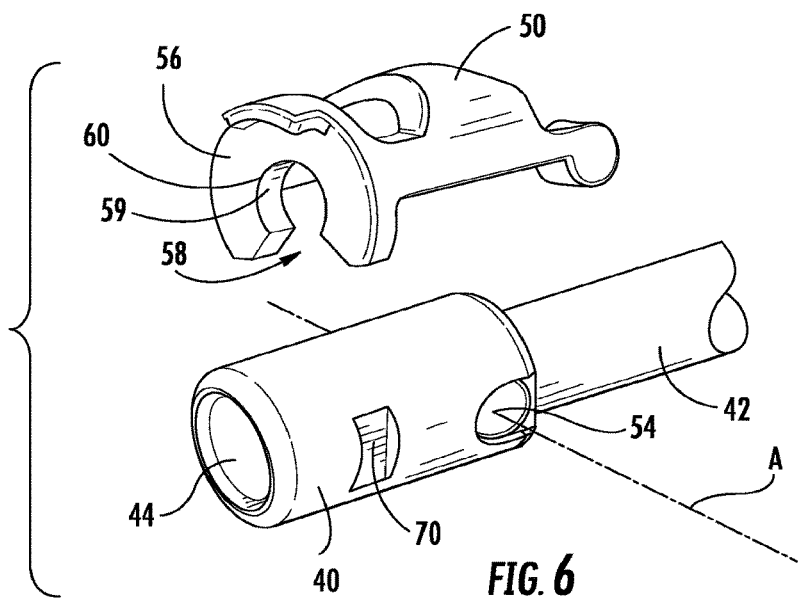
FIG. 6 is an exploded view of the female fitting shown in FIG. 1A, FIG. 7 includes end, plan, and cross-sectional views of a clip of the present quick-connect tube coupling.
Figure 7:
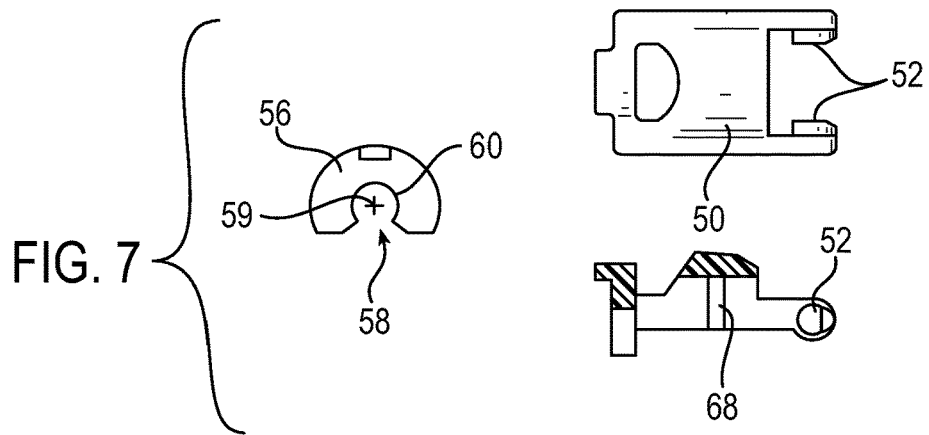

The quick-connect fitting 20 has a pivotable clip 50, as shown in FIGS. 1A through 1C, connecting the female fitting 40 to the male fitting 30 when the male fitting 30 is positioned within the female fitting 40. The clip 50, typically connected to the second connector as discussed above, is pivotable between a first, connected position 64 connecting the female fitting to the male fitting when the male fitting is positioned within the female fitting, as shown in FIG. 1C, and a second, open position 66 in which the male fitting is removable from the female fitting as shown in FIGS. 1A and 1B. With reference to FIGS. 5 through 7, the clip may include a pair of pivot pins 52 positioned to engage corresponding pivot recesses 54 in the outside wall of the female fitting 40. The clip 50 is pivotable about an axis transverse to the longitudinal direction of the quick-connect fitting, the axis shown as "A" in FIG. 6.

Figure 3:
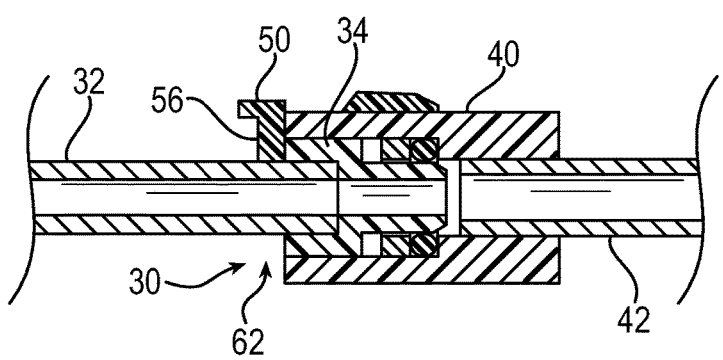
FIG. 3 is a cross-sectional view through the quick-connect tube coupling of FIG. 1C, FIG. 4A includes end and side elevational views of the female fitting shown in FIG. 1A with the clip in an unfastened position, FIG. 4B includes end and side elevational views of the female fitting shown in FIG. 1A with the clip in a fastened position.
Figure 4A:
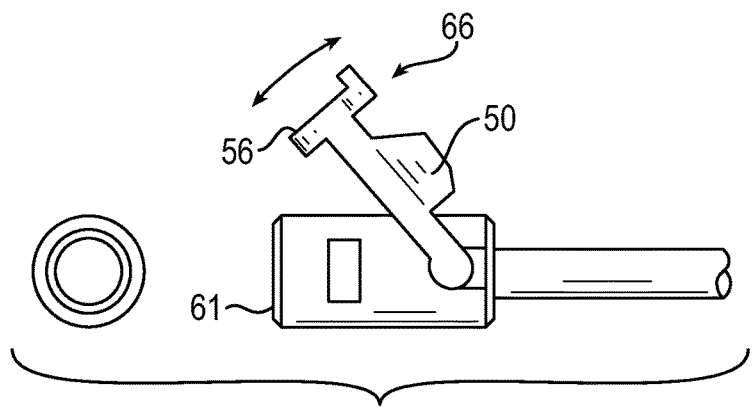
Figure 4B:
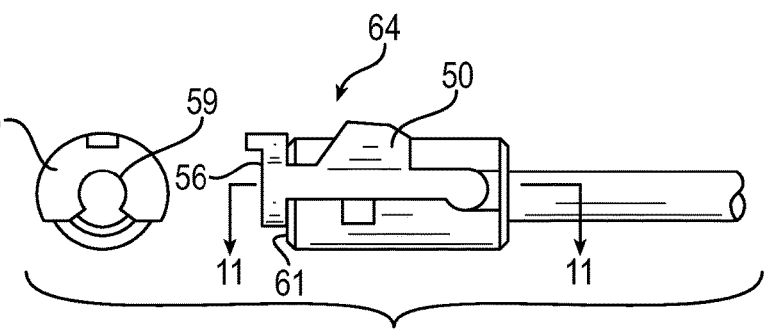
Figure 11:
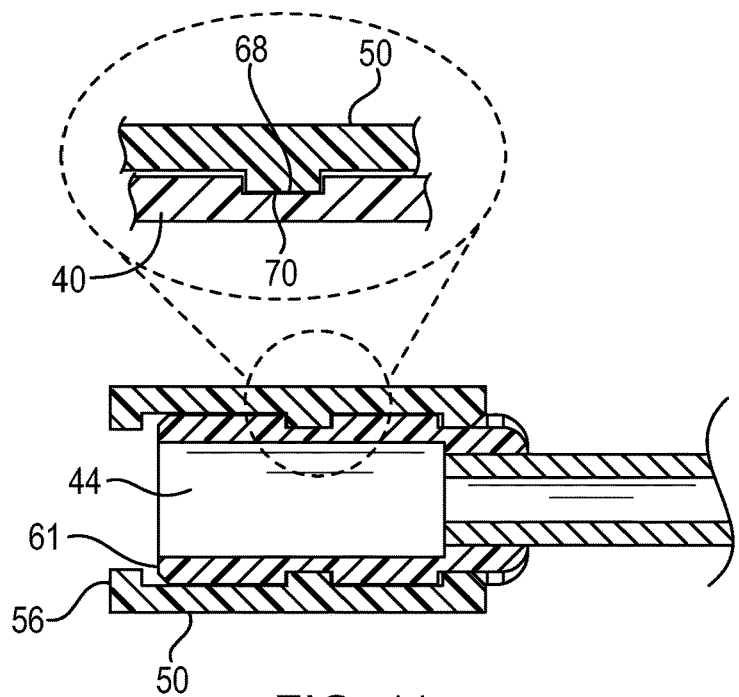
FIG. 11 is a cross-sectional view through the section 11-11 in FIG. 4B.

In one alternative, the clip 50, pivotally connected to the second connector, in the first position engages a tube connected to the first connector or a corresponding feature on the first connector, or a combination thereof. In the alternative shown in FIGS. 6 and 7, the clip 50 includes an end wall 56 operable to retain the male fitting 30 connected to the female fitting 40. The end wall 56 has a tube-engaging aperture 59 to engage the first tube 32, the tube-engaging aperture 59 having a diameter 60 corresponding to the outside diameter of the first tube 32. The end wall 56 may be positioned such that the clip 50 will not move to the clip connected position 64 unless the male fitting 30 is fully engaged with the female fitting 40. As shown in FIGS. 1C, 4B and 11, the end wall 56 and the tube-engaging aperture 59 of the clip 50 extend beyond the end 61 of the second connector or female fitting 40 in the clip connected position 64. To prevent the pivotable clip 50 from moving to an unfastened or disconnected position, the tube-engaging aperture 59 may interlock around the first tube 32. The aperture 59 may include a mouth 58 for receiving the tube into the aperture 59, where the mouth has an opening smaller than the outside diameter of the first tube 32. As shown in FIG. 3, the end wall 56 of the clip 50 acts to block the cylindrical body 34 of the male fitting 30 from moving outwardly, preventing the male fitting 30 from disconnecting from the female fitting 40.

Figure 10:
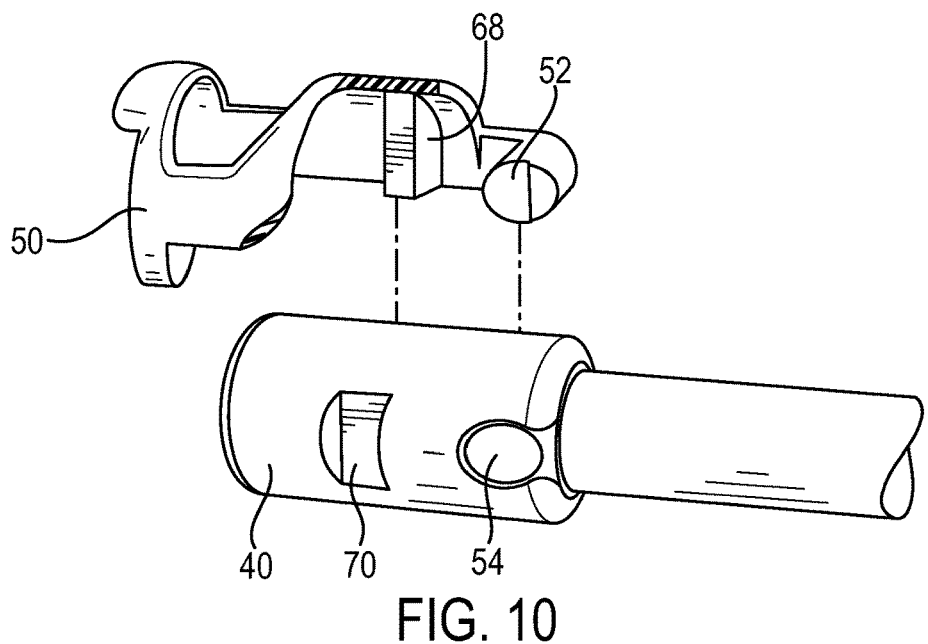
FIG. 10 is an exploded view with a partial section through the clip of the present quick-connect tube coupling.

Referring now to FIG. 10, the clip 50 includes a projection 68 transverse to the longitudinal direction of the female fitting engaging a corresponding engaging feature 70 on the female fitting in the clip first position inhibiting relative movement between the clip and the female fitting in the longitudinal direction of the female fitting. The corresponding engaging features 70 on the female fitting may be selected from the group including, but not limited to, recesses, grooves, opposing projections, snap features, or other engaging or interlocking features. In the exemplary embodiment shown in FIGS. 10 and 11, the corresponding engaging features 70 include recesses in an outside surface of the female fitting. As shown in FIGS. 10 and 11, two projections 68 and corresponding recesses 70 may be provided, with two projections 68 formed, one each on opposing sides of the clip 50, and corresponding recesses 70 formed on each side of the outer surface of the cylindrical cavity 44. Alternatively, the projections 68 may engage other corresponding engaging features 70 such as recesses grooves, opposing projections, snap features, or other engaging or interlocking features on the female fitting as desired. When the clip is in the connected position 64 connecting the male fitting 30 and the female fitting 40, the projections 68 engage the corresponding engaging features 70 resisting movement of the clip 50 relative to the female fitting 40 when forces are applied in the longitudinal direction of the fitting pulling the male and female fittings in opposite directions. The projections 68 and corresponding engaging features 70 further inhibit the quick-connect fitting from unintended decoupling.

Figure 8A:
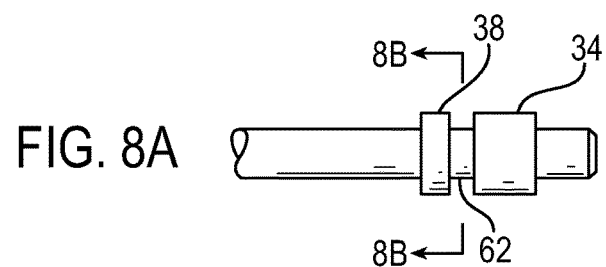
FIG. 8A is a side elevational view of an alternative male fitting of the present quick-connect tube coupling with a support ring around the tube.
Figure 8B:
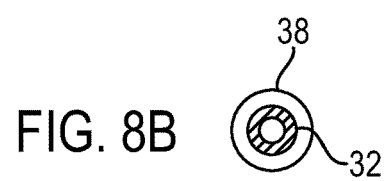
FIG. 8B is a cross-sectional view of the male fitting through the section 8B-8B in FIG. 8A.
Figure 9:
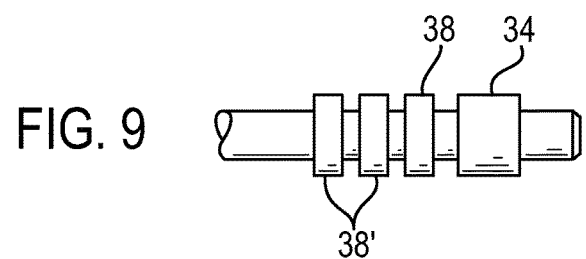
FIG. 9 is an alternative side elevational view of the male fitting shown in FIG. 8A.

In the alternative shown in FIGS. 1 and 3, when the clip is in the connected position 64 such as shown in FIG. 1C, the clip 50 engages the first tube 32 at a tube engagement location 62. In certain applications, the first tube 32 may tend to deform in cross-sectional shape when in a bended position, reducing the engagement between the clip 50 and the tube 32. Optionally, to inhibit cross-sectional deformation of the tube, the male fitting 30 may include a support ring 38 encircling the first tube 32 adjacent the tube engagement location 62 such as shown in FIGS. 8A and 8B. The male fitting shown in FIGS. 8A and 8B may include the support ring 38 being overmolded onto the tube. Alternatively, the support ring 38 may be wrapped around the tube or slid onto the tube and crimped or frictionally engaged to the tube to hold the support ring in position. In one embodiment, the support ring 38 is crosslinked polyethylene having an inside diameter slightly smaller than the tube outside diameter, the ring being installed by expanding the crosslinked polyethylene ring diameter, sliding the expanded ring onto the tube, and allowing the ring to return to its original size, and where the shape memory property of crosslinked polyethylene retains the support ring onto the tube. In one alternative shown in FIG. 9, a plurality of support rings 38' may be positioned adjacent the overmolded ring 38 to provide additional support for the tube in applications where the tube is in a bended position.

In one alternative, not shown, the clip may engage and interlock with a portion of the cylindrical body 34 of the male fitting when in the fastened position. Alternatively, the clip may engage and interlock with a portion of the cylindrical body 34 and the first tube 32 when in the fastened position.

Figure 14:
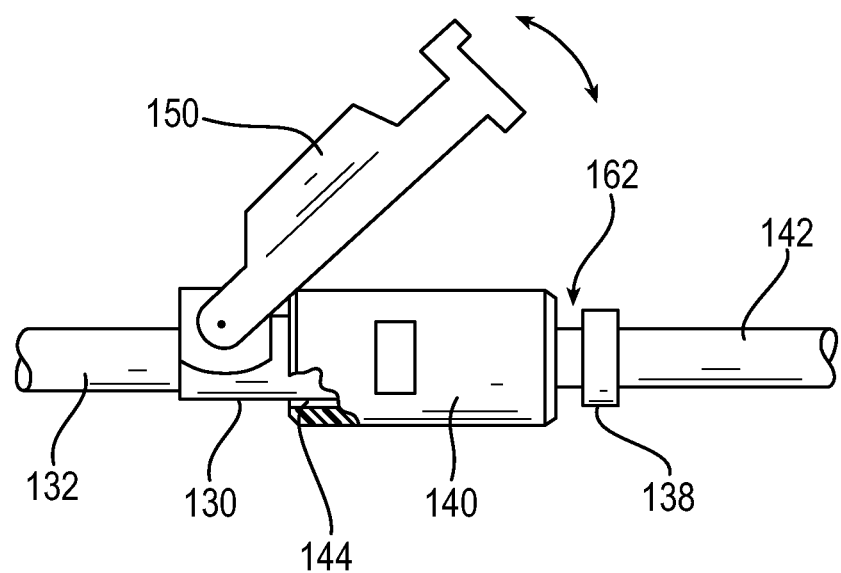
FIG. 14 is a side elevational view with a partial section of an alternative quick-connect tube coupling showing the male and female fittings in engagement and unfastened.

In an alternative shown in FIG. 14, a clip 150 is pivotally connected to a male fitting 130 overmolded onto first tube 132, the clip pivotable about an axis transverse to the longitudinal direction of the male fitting 130 to connect a female fitting 140 having a cylindrical cavity 144 overmolded onto a second tube 142. In the alternative shown in FIG. 14, the clip may include pivot pins (not shown) positioned to engage corresponding pivot recesses in the outside wall of the male fitting 130, and operate analogous to the clip 50 described above but pivoting from the male fitting and engaging the second tube 142. As discussed above with reference to male fitting 30, the second tube 142 may tend to deform in cross-sectional shape when in a bended position, reducing the engagement between the clip 150 and the tube 142. Optionally, to inhibit cross-sectional deformation, the female fitting 140 may include a support ring 138 encircling the second tube 142 adjacent a tube engagement location 162 such as shown in FIG. 14.

The clip 50, 150 is made from a rigid or semi-rigid polymeric material such as polyacetal, nylon or polyamide, acrylonitrile butadiene styrene terpolymer, polystyrene, polycarbonate, polyvinyl chloride, polyethylene terephthalate polyester, or other polymeric material as desired for the application suitable for retaining the male fitting 30 in the cylindrical cavity 44 under the loading and environmental conditions of the desired application. In one example, the clip is glass-filled nylon.

In various alternatives of any of the embodiments of the present invention, the female fitting may be integral to any desired component, such as a component selected from the group consisting of a valve, a tube, a pipe, a diverter, a manifold, a fixture, a Y connector, and a T connector, while the male fitting is provided to engage the integral male fitting. In one exemplary embodiment, shown by example in FIG. 12, a female fitting 240 may be integral to a component such as a solenoid valve 200. Alternatively, the female fitting may be integral to any desired component, such as a component selected from a group consisting of a valve, a tube, a pipe, a diverter, a manifold, a fixture, a Y connector, and a T connector. In the example shown in FIG. 12, the solenoid valve 200 includes an inlet 210 and at least one solenoid 212 corresponding to a female fitting 240. The female fitting 240 includes a longitudinal cylindrical cavity 244. Within the cylindrical cavity 244, the female fitting 240 includes the retaining ring 46 retaining the o-ring 48 as discussed above with reference to the female fitting 40.

Figure 12:
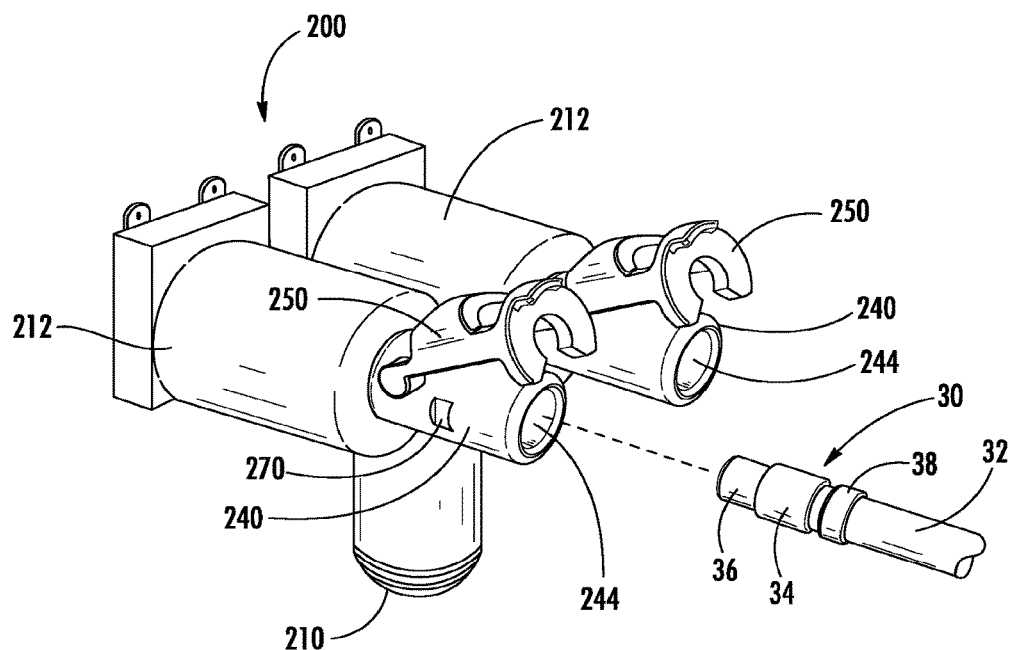
FIG. 12 is a perspective view of an exemplary solenoid valve including a quick connect fitting of the present disclosure.

The female fitting 240 includes a pivotable clip 250, as shown in FIG. 12, operable to connect the female fitting 240 to the male fitting 30 when the male fitting 30 is positioned within the female fitting 240. The clip 250 is pivotable between a first position connecting the female fitting to the male fitting when the male fitting is positioned within the female fitting and a second position in which the male fitting is removable from the female fitting as discussed with reference to female fitting 40 and clip 50. As discussed above, the clip may include a pair of pivot pins positioned to engage corresponding pivot recesses in the outer wall of the female fitting 240. Additionally, the clip 250 may include one or more projections transverse to the longitudinal direction of the female fitting 240, such as the projection 68 shown and described with reference to FIG. 10, engaging a corresponding recess 270 in an outside surface of the female fitting in the clip first position inhibiting relative movement between the clip and the female fitting in the longitudinal direction of the female fitting.

In various alternatives of any of the embodiments of the present invention, the male fitting may be integral to any desired component, such as a component selected from the group consisting of a valve, a tube, a pipe, a diverter, a manifold, a fixture, a Y connector, and a T connector, while the female fitting is provided to engage the integral male fitting. The integral male fitting may include a cylindrical body and a tubular sealing element extending longitudinally therefrom positionable within the female fitting as discussed above with reference to the male fitting 30. The tubular sealing element may be an elongated uniformly-diametered cylindrical element terminating at a beveled tip at an end of the male fitting.

In the present female fitting 40, described above, the retainer ring 46 may be held in the cylindrical cavity 44, 144, 244 by the shape memory property of the crosslinked polymer of the cylindrical cavity compressing against the peripheral surfaces of the retainer ring 46. In the present coupling, the inside diameter of the cylindrical cavity 44, 144, 244 is fixed to a smaller diameter than the outside diameter of the retaining ring 46 by crosslinking the female fitting 40 prior to insertion of the retaining ring 46. As discussed above, crosslinking imparts a "memory" to the polymer's original shape and dimensions so that after being deformed the deformed member tends to resort back to the original dimension, particularly upon the application of, for example, heat or the passage of time. By providing the ring outside diameter slightly larger than the inner walls of the cylindrical cavity, the shape-memory of the female fitting permits leak-proof engagement between the inner walls of the cylindrical cavity and the outside diameter of the retaining ring 46, particularly when the female fitting is made from crosslinked polyethylene or "PEX."

In one application of this invention, the female fitting 40 is made from high density polyethylene that is crosslinked (PEX). PEX contains crosslinked bonds in the polymer structure changing the thermoplastic into a thermoset. Crosslinking may be accomplished during or after the molding of the part. The required degree of crosslinking for crosslinked polyethylene tubing, according to ASTM Standard F 876-93 is between 65-89%. There are three classifications of PEX, referred to as PEX-A, PEX-B, and PEX-C. PEX-A is made by the peroxide (Engel) method. In this method, peroxides blended with the polymer performs crosslinking above the crystal melting temperature. The polymer is typically kept at an elevated temperature and pressure for long periods of time during the extrusion process to form PEX-A. PEX-B is formed by the silane method, also referred to as the "moisture cure" method. In this method, silane compounds blended with the polymer induces crosslinking during molding and during secondary post-extrusion processes, producing cross-links between a crosslinking agent. The process is accelerated with heat and moisture. The crosslinked bonds are formed through silanol condensation between two grafted vinyltrimethoxysilane units. PEX-C is produced by application of radiation, such as by an electron beam using high energy electrons to split the carbon-hydrogen bonds and facilitate crosslinking.

The female fitting 40, the male fitting 30, the first tube 32, and the second tube 42, may be polyethylene or crosslinked polyethylene (PEX) as discussed above, but may also be made from various other polymers as desired for the application. In the practice of this invention, illustrative and non-limiting examples of the polymers that may be used in various combinations to form the first tube 32, the second tube 42, the male fitting 30, and the female fitting 40, include: polyacetals, nylons or polyamides, including various types of nylon-6, nylon-6/6, nylon-6/9, nylon-6/10, nylon-6/12, nylon-11, nylon-12, acrylonitrile butadiene styrene terpolymers, polystyrenes, polycarbonates, polyvinyl chlorides and chlorinated polyvinyl chlorides, polyethylene terephthalate polyester, polyethylene homopolymers and copolymers, including all molecular weight and density ranges and degrees of crosslinking, polypropylene homopolymers and copolymers, polybutene resins, poly(meth)acrylics, polyalkylene terephthalates, polyetherimides, polyimides, polyamide-imides, polyacrylates of aromatic polyesters, polyarylether ketones, polyacrylonitrile resins, polyphenylene oxides including polystyrene miscible blends, polyphenylene sulfides, styrene-acrylonitrile copolymers, styrene-butadiene copolymers, styrene maleic anhydride copolymers, polyarylsulfones, polyethersulfones, polysulfones, ethylene acid copolymers, ethylene-vinyl acetate copolymers, ethylene-vinyl alcohol copolymers, thermoplastic elastomers covering a hardness range of from 30 Shore A to 75 Shore D, including styrenic block copolymers, polyolefin blends (TPO), elastomeric alloys, thermoplastic polyurethanes (TPU), thermoplastic copolyesters, and thermoplastic polyamides, polyvinylidene chlorides, allyl thermosets, bismaleimides, epoxy resins, phenolic resins, unsaturated thermoset polyesters, thermoset polyimides, thermoset polyurethanes, and urea and melamine formaldehyde resins. Other polymeric materials may be selected as suitable for a desired application.

In a preferred embodiment, the polymers for the polymeric male fitting and the polymeric female fitting will be high density polyethylene, which is subsequently crosslinked, preferably by the application of an electron beam, although other modes of crosslinking are envisioned to be within the scope of this invention. In another preferred embodiment, the polymers for the polymeric male fitting and the polymeric female fitting will be glass-filled high density polyethylene, which is subsequently crosslinked by application of an electron beam. The first tube 32 and the second tube 42 may also be crosslinked high density polyethylene.

Figure 13:
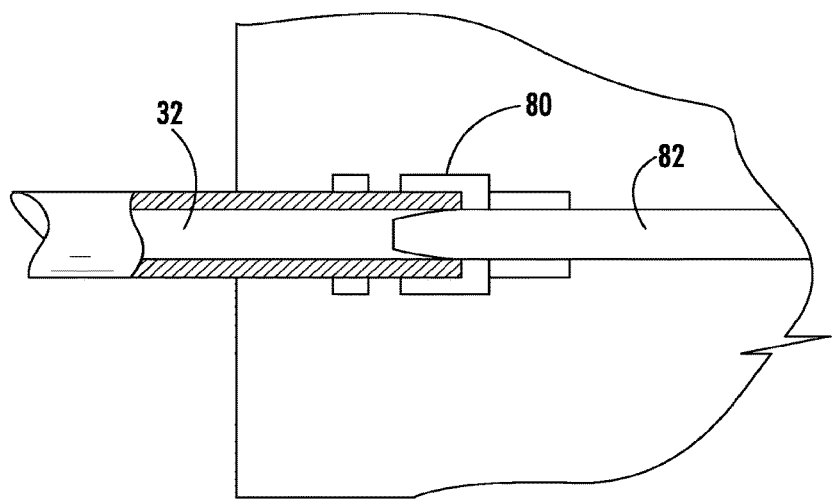
FIG. 13 is a plan view of a portion of an injection mold showing a mold cavity and a partial section of a tube positioned in the mold cavity with a core pin extending into the tube end.

In one exemplary embodiment, a process for providing a quick-connect fitting may include positioning an end of the first tube 32 into a first mold cavity 80 having a desired shape and positioning a core pin 82 at least partially into the end of the first tube as shown, for example, in FIG. 13, the mold cavity co-acting with the core pin and the tube to define an overmolding shape for the male fitting 30. Then, injection overmolding a first polymeric material into the first mold cavity 80 over a portion of the tube end and core pin 82 forming the male fitting 30 having the cylindrical body 34 and a tubular sealing element 36 extending longitudinally therefrom positionable within the polymeric female fitting 40, described and shown with reference to FIG. 1A. The exemplary process includes positioning an end of the second tube into a second mold cavity, not shown, having a desired shape and positioning a core pin at least partially into the end of the second tube, and injection overmolding a second polymeric material into the second mold cavity over a portion of the tube end and core pin forming the female fitting 40 having a longitudinal cylindrical cavity 44, described with reference to FIG. 2. Then, crosslinking the female fitting to set a permanent inside diameter of the cylindrical cavity and shape memory characteristics. An o-ring is provided in the cylindrical cavity having an inside diameter corresponding to an outside diameter of the tubular sealing element in sealing engagement, and a retaining ring is pressed into the cylindrical cavity, the retaining ring having a retaining ring inside diameter larger than the outside diameter of the tubular sealing element and a retaining ring outside diameter larger than the permanent inside diameter of the cylindrical cavity. The process of making a connection includes connecting the female fitting to the male fitting with a pivotable clip when the male fitting is positioned within the female fitting. In the present process, a shape memory property of the crosslinked polymer of the cylindrical cavity holds the retaining ring in the cylindrical cavity.

Optionally, the process may further include overmolding a ring around the first tube adjacent a location the clip engages the first tube.

The clip may be pivotally connected to the female fitting or the male fitting, the clip pivotable about an axis transverse to the longitudinal direction of the fitting as discussed above with reference to FIGS. 6 and 14. The clip may further providing an end wall having a tube-engaging aperture operable to engage the first tube, the end wall operable to retain the male fitting connected to the female fitting as discussed above with reference to FIGS. 6 and 7.

As discussed above, the polymeric female fitting may be made from crosslinked high density polyethylene. In a preferred alternative, the polymeric male fitting and the polymeric female fitting are crosslinked high density polyethylene. As discussed above, the first tube and the second tube may be crosslinked high density polyethylene.

In certain embodiments of the present tube coupler, the male fitting 30 is affixed to the first tube 32 and the female fitting 40 affixed to the second tube 42 by injection overmolding. In a preferred embodiment of the invention, the composition of the fitting polymer and the composition of the tube polymer will be such that the polymers are capable of at least some melt fusion at contacting interfaces between the tube and the overmolded fitting to increase the leakproof characteristics of the interface between the tube and the overmolded fitting. In a more preferred embodiment, this interfacial bonding will extend along the entire length of the physical contacting surfaces between tube and the overmolded fitting. However, it is recognized that in some applications of this invention, the bonding need only occur along a portion of these regions. In yet another alternative, bonding will occur between the tube and overmolded fitting without melt fusion occurring between the tube and overmold polymers.

There are several ways by which bonding by melt fusion may be effected. One of the simplest procedures is to insure that at least a component of the polymer of the tube and the overmolded polymer is the same. Alternatively, it would be possible to insure that at least a portion of the polymer composition of the overmolded polymer is sufficiently similar or compatible so as to permit the melt fusion or blending or alloying to occur at least in the interfacial region between the exterior of the tube and the interior region of the overmolded fitting. Another manner in which to state this would be to indicate that at least a portion of the polymer compositions of the plastic conduit and the overmolded polymer are miscible.

An exemplary process for securing a fluid component to another fluid component, the process may include installing a polymeric first connector in fluid communication with a first component, and a polymeric second connector in fluid communication with a second component, the first connector being either a male fitting or a female fitting, and the other of the male fitting or the female fitting being the second connector. As discussed above, the female fitting has a longitudinal cylindrical cavity having therein a retaining ring retaining an o-ring, and the male fitting has a cylindrical body and a tubular sealing element extending longitudinally therefrom positionable within the polymeric female fitting and o-ring in sealing engagement. The second connector comprises a clip pivotably connected to the second connector, moving between a first position connecting the female fitting to the male fitting when the male fitting is positioned within the female fitting and a second position in which the male fitting is removable from the female fitting. The process includes positioning the male fitting within the female fitting in sealing engagement, and connecting the female fitting to the male fitting by fastening the pivotable clip connecting the female fitting to the male fitting.

For certain applications, the first connector is integral with the first component. Alternatively, or additionally, the second connector is integral with the second component. The first connector may be overmolded onto a tube in fluid communication with the first component. Alternatively, or additionally, the second connector may be overmolded onto a tube in fluid communication with the second component.

Alternatively, an exemplary process for securing a fluid component to another fluid component may include installing a polymeric first connector overmolded onto a first tube in fluid communication with a first component, and a polymeric second connector in fluid communication with a second component, the first connector being either a male fitting or a female fitting, and the other of the male fitting or the female fitting being the second connector. As discussed above, the female fitting has a longitudinal cylindrical cavity having therein a retaining ring retaining an o-ring, and the male fitting has a cylindrical body and a tubular sealing element extending longitudinally therefrom positionable within the polymeric female fitting and o-ring in sealing engagement. The second connector comprises a clip pivotably connected to the second connector, moving between a first position connecting the female fitting to the male fitting when the male fitting is positioned within the female fitting and a second position in which the male fitting is removable from the female fitting. The process includes positioning the male fitting within the female fitting in sealing engagement, and connecting the female fitting to the male fitting by fastening the pivotable clip connecting the female fitting to the male fitting, the clip engaging the first tube at a tube engagement location in the first position.

For certain applications, the second connector is integral with the second component. Alternatively, the second connector may be overmolded onto a tube in fluid communication with the second component.

In another example, such as securing a water source to a household appliance, such as a refrigerator, dishwasher, humidifier, ice maker, or any other appliance, a process for securing one fluid component to another fluid component may include installing a first tube having a polymeric male fitting overmolded onto a first tube in fluid communication with a first component, the male fitting having a cylindrical body and a tubular sealing element extending longitudinally therefrom positionable within a crosslinked polymeric female fitting overmolded onto a second tube. Then, installing the second tube with the crosslinked polymeric female fitting in fluid communication with a second component, the female fitting having a longitudinal cylindrical cavity having therein a retaining ring retaining an o-ring. The o-ring has an inside diameter corresponding to an outside diameter of the tubular sealing element in sealing engagement. The process may include positioning the male fitting within the female fitting in sealing engagement, and connecting the female fitting to the male fitting by fastening a pivotable clip connecting the female fitting to the male fitting, the clip engaging the first tube or the second tube at a tube engagement location in the first position adjacent a support ring encircling said tube. The male fitting may include the support ring overmolded onto the first tube.

As shown in FIGS. 5 and 6, in certain embodiments the clip is pivotally connected to the female fitting, the clip pivotable about an axis transverse to the longitudinal direction of the female fitting as discussed above with reference to FIG. 6. The clip may also include an end wall having a tube-engaging aperture operable to engage the first tube, the end wall operable to retain the male fitting connected to the female fitting as discussed above with reference to FIGS. 6 and 7. Alternatively, the clip is pivotally connected to the male fitting, the clip pivotable about an axis transverse to the longitudinal direction of the male fitting as discussed with reference to FIG. 14.

As discussed above, the polymeric female fitting may be crosslinked high density polyethylene. In a preferred alternative, the polymeric male fitting and the polymeric female fitting are crosslinked high density polyethylene. As discussed above, the first tube and the second tube may be crosslinked high density polyethylene.

The clip may include a projection transverse to the longitudinal direction of the female fitting engaging a corresponding recess in an outside surface of the female fitting in the clip first position inhibiting relative movement between the clip and the female fitting in the longitudinal direction of the female fitting as discussed with reference to FIGS. 10 and 11.

Various embodiments of the presently disclosed quick-connect clip may be provided in a process for securing one component to another in a fluid system. A process for securing one fluid component to another fluid component may include the steps of installing a first tube having a polymeric male fitting overmolded onto the first tube in fluid communication with a first component, the male fitting having a cylindrical body and a tubular sealing element extending longitudinally therefrom positionable within a crosslinked polymeric female fitting overmolded onto a second tube; and installing the second tube with the crosslinked polymeric female fitting in fluid communication with a second component, the female fitting having a longitudinal cylindrical cavity having therein a retaining ring retaining an o-ring. The o-ring may have an inside diameter corresponding to an outside diameter of the tubular sealing element in sealing engagement. Then, the process includes positioning the male fitting within the female fitting in sealing engagement, and connecting the female fitting to the male fitting by fastening a pivotable clip connecting the female fitting to the male fitting, the clip engaging the first tube or the second tube at a tube engagement location in the first position.

In the present process, the clip may be pivotally connected to the female fitting, the clip pivotable about an axis transverse to the longitudinal direction of the female fitting, the clip engaging the first tube in the first position. Alternatively, the clip may be pivotally connected to the male fitting, the clip pivotable about an axis transverse to the longitudinal direction of the male fitting, the clip engaging the second tube in the first position. In either case, the clip may include an end wall having a tube-engaging aperture operable to engage the first tube, the end wall operable to retain the male fitting connected to the female fitting.

In various embodiments of the present process, the polymeric female fitting may be a crosslinked polymer, and the process may include holding the retaining ring in the cylindrical cavity by a shape memory property of the crosslinked polymer of the cylindrical cavity. At least one of the polymeric female fitting and the polymeric male fitting may be crosslinked high density polyethylene. Additionally, the first tube and the second tube may be crosslinked high density polyethylene.

While the invention has been illustrated and described in detail in the drawings and foregoing description, the same is to be considered as illustrative and not restrictive in character, it being understood that only preferred embodiments have been shown and described and that all changes and modifications that come within the spirit of the invention are desired to be protected by the appended claims and the equivalents thereof.

What is claimed is:

1. A quick-connect fitting comprising:
   a polymeric first connector,
   a polymeric second connector,
   the first connector being either a male fitting or a female fitting, and the other of the male fitting or the female fitting being the second connector,
   the female fitting having a longitudinal cylindrical cavity having therein a retaining ring retaining an o-ring,
   the male fitting having a cylindrical body and a tubular sealing element extending longitudinally therefrom positionable within the female fitting and o-ring in sealing engagement, and
   a clip pivotably connected to the second connector moving between a first position connecting the female fitting to the male fitting when the male fitting is positioned within the female fitting and a second position in which the male fitting is removable from the female fitting,
   the clip comprises
      an end wall having a tube-engaging aperture operable to engage the first connector in the first position, the end wall and the tube-engaging aperture extending beyond an end of the second connector and operable to retain the male fitting connected to the female fitting in the first position, and
      a projection transverse to the longitudinal direction of the female fitting engaging a corresponding engaging feature on the female fitting in the clip first position inhibiting relative movement between the clip and the female fitting in the longitudinal direction of the female fitting.

2. The quick-connect fitting according to claim 1, where the first connector is integral with a first component, the first component being one selected from a group consisting of a valve, a tube, a pipe, a diverter, a manifold, a fixture, a Y connector, and a T connector.

3. The quick-connect fitting according to claim 2, where the clip engages the first connector or the first component in the first position.

4. The quick-connect fitting according to claim 1, where the polymeric first connector is overmolded onto a first tube.

5. The quick-connect fitting according to claim 1, where the second connector is integral with a second component, the second component being one selected from a group consisting of a valve, a tube, a pipe, a diverter, a manifold, a fixture, a Y connector, and a T connector.

6. The quick-connect fitting according to claim 1, where the polymeric second connector is overmolded onto a tube.

7. The quick-connect fitting according to claim 1, where the first connector is the male fitting, the clip pivotally connected to the female fitting, the clip pivotable about an axis transverse to the longitudinal direction of the female fitting.

8. The quick-connect fitting according to claim 1, where the first connector is the female fitting, the clip pivotally connected to the male fitting, the clip pivotable about an axis transverse to the longitudinal direction of the male fitting.

9. The quick-connect fitting according to claim 1, where the retaining ring has a retaining ring inner diameter larger than the outer diameter of the tubular sealing element of the male fitting and a retaining ring outer diameter larger than an inside diameter of the cylindrical cavity of the female fitting, and where the female fitting is a crosslinked polymer and a shape memory property of the crosslinked polymer of the cylindrical cavity holds the retaining ring in the cylindrical cavity.

10. The quick-connect fitting according to claim 1, where at least one of the polymeric female fitting and the polymeric male fitting is crosslinked high density polyethylene.

11. The quick-connect fitting according to claim 1, where the tube-engaging aperture comprises:

a diameter corresponding to an outside diameter of the first tube; and a mouth for receiving the tube into the tube-engaging aperture, where the mouth has an opening smaller than the outside diameter of the first tube.

12. The quick-connect fitting according to claim 1, where the second connector having an outside wall and further comprises a pair of pivot recesses in the outside wall; and the clip further comprises a pair of pivot pins positioned to engage the pair of pivot recesses in the outside wall.

* * * * *